United States Patent
Krenz et al.

(10) Patent No.: US 10,278,225 B2
(45) Date of Patent: Apr. 30, 2019

(54) SYSTEMS AND METHODS FOR DUAL-MODE COMMUNICATION USING AN ELECTRONIC DEVICE

(71) Applicant: Motorola Mobility LLC, Chicago, IL (US)

(72) Inventors: Eric Le Roy Krenz, Crystal Lake, IL (US); Robert Tristan Love, Barrington, IL (US); Istvan Janos Szini, Grayslake, IL (US)

(73) Assignee: MOTOROLA MOBILITY LLC, Chicago, IL (US)

( * ) Notice: Subject to any disclaimer, the term of this patent is extended or adjusted under 35 U.S.C. 154(b) by 9 days.

(21) Appl. No.: 15/409,927

(22) Filed: Jan. 19, 2017

(65) Prior Publication Data

US 2018/0206277 A1 Jul. 19, 2018

(51) Int. Cl.
 *H04W 76/15* (2018.01)
 *H04W 24/02* (2009.01)
 *H04W 28/22* (2009.01)
 *H04W 88/06* (2009.01)
 *H04L 12/26* (2006.01)

(52) U.S. Cl.
 CPC ........... *H04W 76/15* (2018.02); *H04W 24/02* (2013.01); *H04W 28/22* (2013.01); *H04L 43/0823* (2013.01); *H04L 43/0852* (2013.01); *H04L 43/16* (2013.01); *H04W 88/06* (2013.01)

(58) Field of Classification Search
 CPC ...... H04W 88/06; H04W 76/00; H04W 76/15
 USPC ................................ 455/552.1, 67.11, 550.1
 See application file for complete search history.

(56) References Cited

U.S. PATENT DOCUMENTS

| | | | | |
|---|---|---|---|---|
| 9,572,079 | B2* | 2/2017 | Somayazulu | H04W 88/06 |
| 2006/0148515 | A1* | 7/2006 | Choi | H04W 48/18 |
| | | | | 455/552.1 |
| 2017/0013565 | A1* | 1/2017 | Pelletier | H04W 52/146 |
| 2017/0013569 | A1* | 1/2017 | Braxton | H04W 52/245 |

OTHER PUBLICATIONS

Brewer, E. et al., "A Network Architecture for Hetergeneous Mobile Computing", IEEE Personal Communications, Oct. 1998, pp. 8-24.
Altair Semiconductor, FourGee-1150/6401, retrieved on Dec. 2, 2016 from http://altair-semi.com/product/fourgee-1150-6401/.

* cited by examiner

Primary Examiner — John J Lee (57) ABSTRACT

Systems and methods modify the behavior and operation of an electronic device and also enable a server to intercept and process incoming communications for the electronic device, based on whether the electronic device is communicating with a network via a high data rate mode or a low data rate mode. According to certain aspects, whether the electronic device is communicating with the network via a high data rate mode or a low data rate mode may be determined by calculating a delay index based on the amount of repeated data received by the electronic device. The electronic device may be able to maintain a more consistent connection with the network and improve the experience and satisfaction of users.

20 Claims, 4 Drawing Sheets

SYSTEMS AND METHODS FOR DUAL-MODE COMMUNICATION USING AN ELECTRONIC DEVICE

FIELD

This application generally relates to systems and methods of dual-mode communication using an electronic device. In particular, this application relates to systems and methods for modifying the operation of the electronic device and enabling a server to intercept and process incoming communications for the electronic device, based on whether the electronic device is communicating via a high data rate mode or a low data rate mode.

BACKGROUND

Electronic devices, such as smartphones, tablet computers, and wearable devices, have become ubiquitous. The electronic devices often wirelessly communicate with remote servers and/or other devices over various types of connections, such as wireless local area networking (WLAN) (e.g., Wi-Fi, etc.), wireless wide area networking (WWAN) (e.g., LTE, CDMA, GSM, etc.), and personal area networking (PAN) (e.g., Bluetooth, ZigBee, etc.). Data may be transmitted and received by the electronic devices in order to facilitate the use of the electronic devices. For example, users of electronic devices may be able to communicate using email, phone calls, SMS, etc. by receiving and transmitting data via a connection.

Wearable devices, in particular, are preferred by certain users because of their compact size, portability, and their ability to communicate without the need for the users to also carry a larger device as well. For example, data about users, such as health-related information, can be more easily collected using wearable devices and directly transmitted to remote servers from the wearable devices. As another example, wearable devices may receive email, SMS, and other types of messages, and/or be used for mapping and directions.

However, wearable devices and other relatively small electronic devices may have limited communication performance, due to their size and placement on a user. For example, antenna for different types of communication (WLAN, WWAN, PAN, GPS, etc.) need to be integrated into the small package of a wearable device. These antennas may have reduced performance, e.g., efficiency and bandwidth, because the free-space wavelengths of the frequencies used by these different types of communication are greater than the physical size of the small electronic devices. Furthermore, the placement of wearable devices on a user can also reduce antenna performance due to impedance loading and loss effects. The reduced performance of the antennas can lead to slower data rate transmission, reduced battery life, and decreased user satisfaction. While it is possible to mitigate these effects by making the electronic devices larger and/or placed farther from the body of the user, such solutions would defeat the purpose of having and using a small electronic device, particularly in the case of wearable devices.

Accordingly, there is an opportunity for systems and methods that address these concerns and enable more consistent communications capabilities of small electronic devices to improve user experience and satisfaction.

SUMMARY

In an embodiment, an electronic device includes a transceiver, a user interface, a processor, and a memory. The transceiver may be operatively coupled with the processor and be configured to wirelessly communicate via a high data rate mode and a low data rate mode. The user interface may be operatively coupled with the processor. The processor may be configured to determine whether the transceiver is communicating via the high data rate mode or the low data rate mode, and modify operation of the electronic device based on whether the transceiver is communicating via the high data rate mode or the low data rate mode. The memory may be operatively coupled with the processor.

In another embodiment, a system includes an electronic device and a server. The electronic device may include a first transceiver, a first processor, and a first memory. The first transceiver may be operatively coupled to the first processor and configured to wirelessly communicate with a second transceiver via a high data rate mode and a low data rate mode, and transmit a first notification to the second transceiver when the first transceiver is communicating via the low data rate mode, wherein the first notification indicates that the electronic device is communicating via the low data rate mode. The first processor may be configured to determine whether the first transceiver is communicating via the high data rate mode or the low data rate mode, and modify operation of the electronic device based on whether the first transceiver is communicating via the high data rate mode or the low data rate mode. The first memory may be operatively coupled with the first processor.

The server may include a second transceiver, a second processor, and a second memory. The second transceiver may be operatively coupled with the second processor and be configured to wirelessly communicate with the first transceiver via the high data rate mode and the low data rate mode, and receive the first notification from the electronic device. The second processor may be configured to intercept and process an incoming communication for the electronic device based on a preset configuration, in response to receiving the first notification from the electronic device. The second memory may be operatively coupled with the second processor.

In a further embodiment, a method includes determining whether a transceiver of an electronic device is communicating via a high data rate mode or a low data rate mode, modifying operation of the electronic device based on whether the transceiver is communicating via the high data rate mode or the low data rate mode, and displaying a message on a user interface of the electronic device when the transceiver is communicating via the low data rate mode, the message indicating that the operation of the electronic device has been modified.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

DETAILED DESCRIPTION

Figure 1:
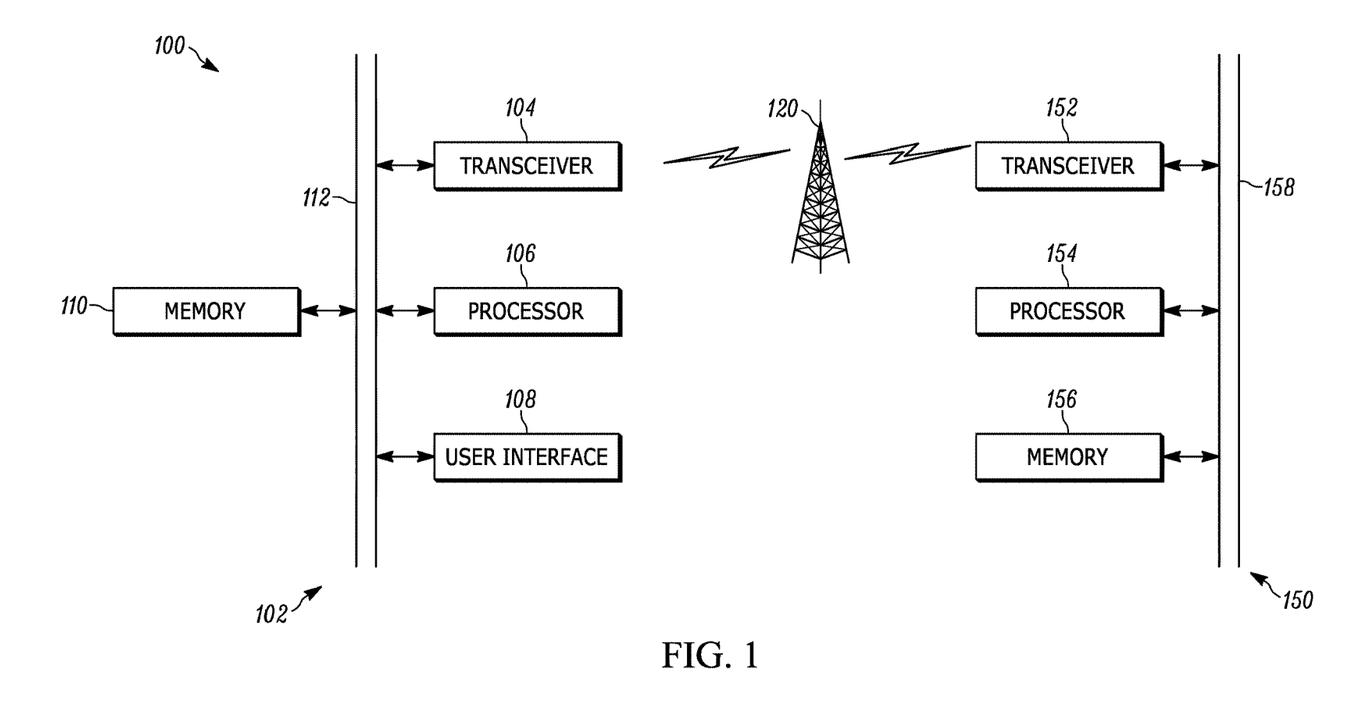
FIG. 1 is an exemplary system including block diagrams of an electronic device and a server, in accordance with some embodiments.

FIG. 1 illustrates an exemplary system 100 in which embodiments may be utilized. The system 100 includes an electronic device 102 and a server 150 that are in communication via a network 120. The electronic device 102 may also communicate with other devices, servers, etc. via the network 120 or directly. The electronic device 102 may be stationary or portable and may be, for example, a wearable device, a smartphone, a cellular phone, a personal digital assistant, a tablet computer, a laptop computer, and the like. The electronic device 102 may be able to communicate with the network 120, such as using a WLAN, WWAN, and/or other suitable connection. The server 150 may be able to communicate with the network 120 using a suitable wireless and/or wired connection.

The electronic device 102 may include a processor 106 in communication via a bus 112 with a transceiver 104, a user interface 108, and a memory 110. The processor 106 may be configured to perform various actions on the electronic device 102 and/or control the transceiver 104 and/or the user interface 108. Such actions may include placing or receiving a phone call, accessing a website, taking a picture, and executing various applications, for example.

The server 150 may include a processor 154 in communication via a bus 158 with a transceiver 152 and a memory 156. The processor 154 may be configured to perform various actions on the server 150 and/or control the transceiver 152. In some embodiments, the server 150 may be configured as a cloud service that intercepts and processes incoming communications for the electronic device 102, as described in more detail below. The server 150 may be in communication with other devices and/or entities (not shown), such as other electronic devices, servers, etc.

A user may utilize the electronic device 102 to perform various functions, such as communicating with others through email, phone, SMS, etc. The electronic device 102 may be able to modify its operation and behavior depending on whether the electronic device 102 is communicating with the network 120 via a high data rate mode or a low data rate mode. By modifying its operation based on the data rate being transmitted and/or received, the electronic device 102 may be able to maintain a more consistent connection with the network 120 and thereby improve the experience and satisfaction of the user. In addition, the server 150 may intercept and process incoming communications for the electronic device 102 depending on whether the electronic device 102 is communicating with the network 120 via a high data rate mode or a low data rate mode. By intercepting incoming communications for the electronic device 102, the server 150 may be able to process such incoming communications, even if the incoming communications would not normally be received by the electronic device 102 in a low data rate mode. The processing of incoming communications for the electronic device 102 may also make them more useful for the user.

For example, when the electronic device 102 is communicating with the network 120 in a low data rate mode, incoming voice calls may be routed to a voicemail service, the voicemail may be transcribed to text, and the text may be forwarded to the user. The caller may also hear an automated response (e.g., that the user is not available). As another example, when the electronic device 102 is communicating with the network 120 in a low data rate mode, non-text portions (e.g., images or video) of incoming messages (e.g., email, text messages, instant messages, etc.) may be stripped such that the messages may be delivered without the non-text portions. In addition, the non-text portions of the messages may be replaced with links to stored copies of the non-text portions so that the user can later download them. It should be appreciated that other benefits and efficiencies are envisioned.

The software in the memory 110, 156 may include one or more separate programs or applications. The programs may have ordered listings of executable instructions for implementing logical functions. The software may include a suitable operating system of the electronic device, such as Android from Google, Inc., iOS from Apple, Inc., or Windows Phone and Windows 10 Mobile from Microsoft Corporation. The operating system essentially controls the execution of other computer programs, and provides scheduling, input-output control, file and data management, memory management, and communication control and related services.

The transceiver 104, 152 may send and receive data over the network 120, for example. The transceiver 104, 152 may be adapted to receive and transmit data over a wireless and/or wired connection. The transceiver 104, 152 may function in accordance with the IEEE 802.11 standard or other standards. More particularly, the transceiver 104, 152 may be a WWAN transceiver configured to communicate with a wide area network (e.g., the network 120) including one or more cell sites or base stations to communicatively connect the electronic device 102 and the server 150 to additional devices or components. Further, the transceiver 104, 152 may be a WLAN and/or WPAN transceiver configured to connect the electronic device 102 and the server 150 to local area networks and/or personal area networks, such as a Bluetooth network or Bluetooth Low Energy connection.

The user interface 108 may include additional I/O components (not shown), such as keys, buttons, lights, LEDs, cursor control devices, haptic devices, etc. The display and the additional I/O components may be considered to form portions of the user interface 108 (e.g., portions of the electronic device 102 associated with presenting information to the user and/or receiving inputs from the user). In some embodiments, the display is a touchscreen display composed of singular or combinations of display technologies such as electrophoretic displays, electronic paper, polyLED displays, OLED displays, AMOLED displays, liquid crystal displays, electrowetting displays, rotating ball displays, segmented displays, direct drive displays, passive-matrix displays, active-matrix displays, lenticular barriers, and/or others. Further, the display can include a thin, transparent touch sensor component superimposed upon a display section that is viewable by a user. For example, such displays include capacitive touch screens, resistive touch screens, surface acoustic wave (SAW) touch screens, optical imaging touch screens, and the like.

Figure 2:
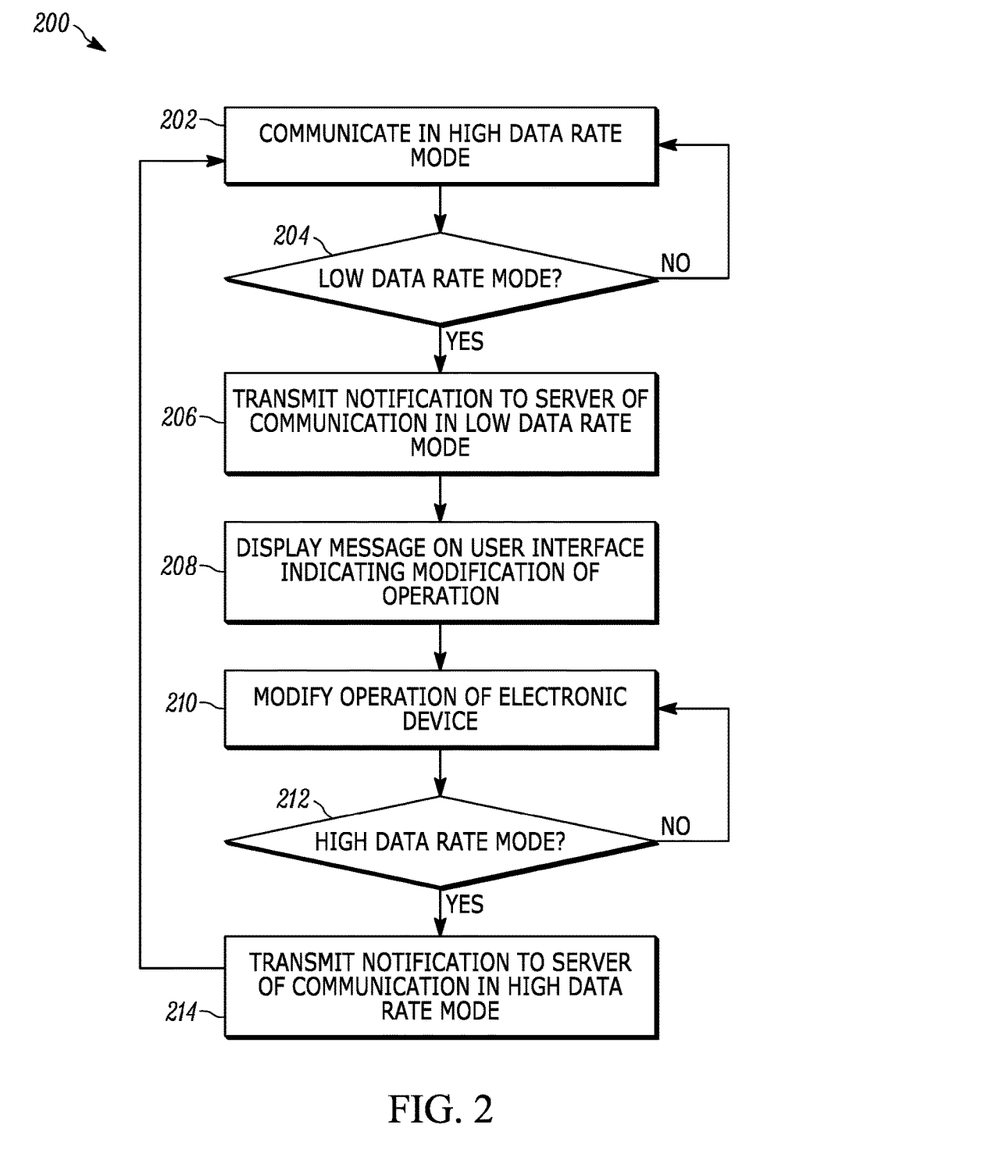
FIG. 2 is a flow diagram depicting the modification of the operation of an electronic device based on whether the electronic device is communicating via a high data rate mode or a low data rate mode, in accordance with some embodiments.
Figure 3:
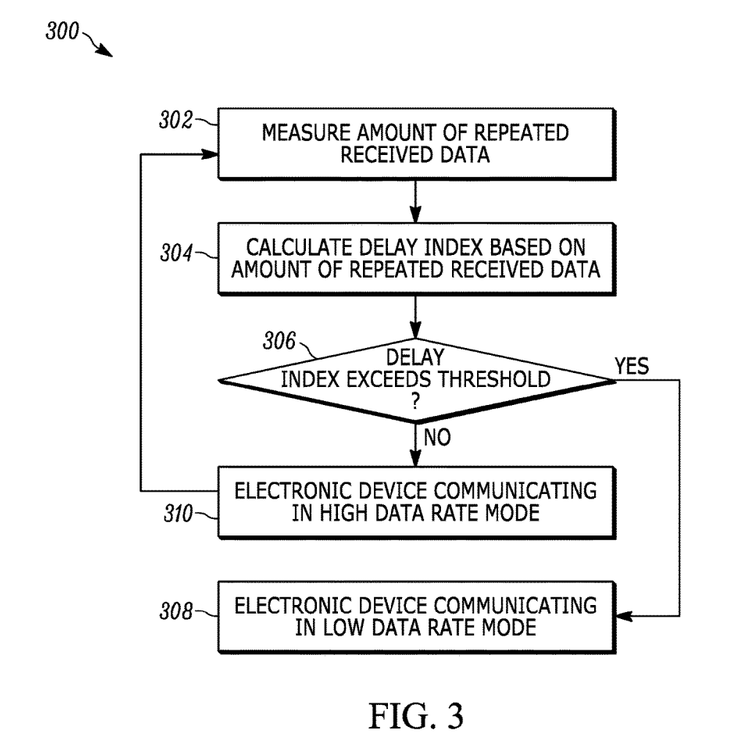
FIG. 3 is a flow diagram depicting the determination of whether an electronic device is communicating via a high data rate mode or a low data rate mode, in accordance with some embodiments.
Figure 4:
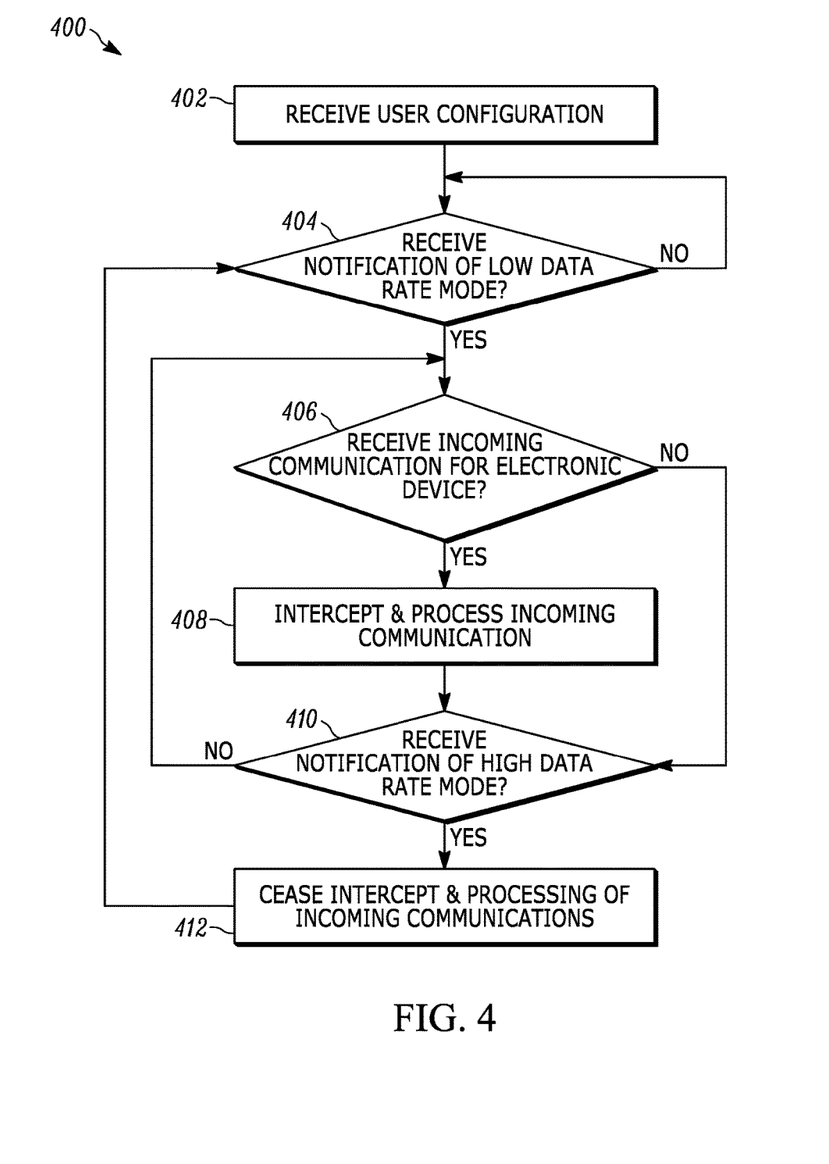
FIG. 4 is a flow diagram depicting the operation of a server in intercepting and processing incoming communications for an electronic device, in accordance with some embodiments.

FIGS. 2-3 illustrate embodiments of methods 200, 300 for modifying the operation and behavior of the electronic device 102 depending on whether the electronic device 102 is communicating with the network 120 via a high data rate mode or a low data rate mode. In particular, FIG. 2 illustrates a method 200 for the electronic device 102 to modify its operation and behavior depending on whether the electronic device 102 is communicating with the network 120 via a high data rate mode or a low data rate mode. FIG. 3 illustrates a method 300 for the electronic device 102 to determine whether it is communicating with the network 120 via a high data rate mode or a low data rate mode. FIG. 4 illustrates an embodiment of a method 400 for the server 150 to intercept and process incoming communications for the electronic device 102 depending on whether the electronic device 102 is communicating with the network 120 via a high data rate mode or a low data rate mode. Using the methods 200, 300, 400 can enable the electronic device 102 to have better connectivity and performance than a typical small electronic device, e.g., a wearable device, and thereby increase user satisfaction and experience with the electronic device 102.

In general, a computer program product in accordance with the embodiments includes a computer usable storage medium (e.g., standard random access memory (RAM), an optical disc, a universal serial bus (USB) drive, or the like) having computer-readable program code embodied therein, wherein the computer-readable program code is adapted to be executed by the processor (e.g., working in connection with an operating system) to implement the methods described below. In this regard, the program code may be implemented in any desired language, and may be implemented as machine code, assembly code, byte code, interpretable source code or the like (e.g., via C, C++, Java, Actionscript, Objective-C, Javascript, CSS, XML, and/or others).

Referring to the method 200 of FIG. 2, the electronic device 102 may be communicating with the network 120 via a high data rate mode, such as step 202. High data rate modes can include cellular modes such as LTE (Long-Term Evolution) Category 1 or higher. For example, LTE Category 1 has a nominal data rate of 10 Mbps and LTE Category 4 has a nominal data rate of 150 Mbps. The electronic device 102 may be communicating with the network 120 via a high data rate mode in regular normal usage by a user, such as when the user is in an open-air environment and the electronic device 102 can easily maintain a connection with the network 120.

It may be determined whether the electronic device 102 is communicating with the network 120 via a low data rate mode, such as step 204. In step 204, an application layer of the electronic device 102 may be notified whether it is communicating with the network 120 in a high data rate mode or a low data rate mode. For example, communications between a baseband processor and an applications processor may indicate what data mode the transceiver 104 of the electronic device 102 is communicating in. Software executing in the applications processor may monitor the baseband processor to discover which data mode the transceiver 104 is communicating in. In addition, a particular embodiment of step 204 for determining whether the electronic device 102 is communicating with the network 120 via a low data rate mode is shown in the method 300 of FIG. 3 described in more detail below. Another embodiment of step 204 for determining whether the electronic device 102 is communicating with the network 120 via a low data rate mode includes determining that the transmission rate of the electronic device 102 is below a threshold and/or determining that the number of times the electronic device 102 transmits per day or per year is below a threshold.

Low data rate modes can include range-extended cellular modes such as Narrow Band Internet of Things (NB-IoT) in Release 13 of LTE or enhanced Machine Type Communication (eMTC) also in Release 13 of LTE. Further low data rate modes may be updated in later LTE releases as captured in the corresponding 3GPP specifications. LTE devices which support the NB-IoT feature are sometimes referred to as Cat-M2 devices while LTE devices supporting eMTC are referred to as Cat-M1 devices. For example, NB-IoT has a carrier bandwidth of 200 kHz (with bandwidth occupancy of 180 kHz equivalent to the bandwidth of one LTE physical resource block) and a maximum data rate of approximately 200 kbps. eMTC has a carrier bandwidth of 1.4 MHz (with bandwidth occupancy of 1.08 MHz or 6 LTE physical resource blocks) and a maximum data rate of 1 Mbps.

These low data rate modes generally have a greater range and enhanced coverage because of their narrower bandwidths, as compared to the wider bandwidths of high data rate modes. In embodiments, in a subset of low data rate modes (called ultra-low data rate modes), bits of data may be sent to and from the electronic device 102 multiple times in order to ensure that a piece of particular data is successfully transmitted. For example, the coverage afforded by using such ultra-low data rate modes may be extended by 15-20 dB by resending bits of data up to 2048 times. Using an ultra-low data rate mode may, however, result in high latency and even lower effective data rate than in the low data rate modes described previously. Accordingly, the electronic device 102 may be able to maintain a connection and communicate with the network 120 via a low data rate mode when in environments such as a lower level of a building. More specifically, NB-IoT may achieve a maximum coupling loss 20 dB higher than LTE Rel-12. Coverage extension can be achieved by trading off data rate through increasing the number of repetitions. Coverage enhancement is ensured also by introducing single subcarrier NPUSCH transmission and π/2-BPSK modulation to maintain close to 0 dB PAPR, thereby reducing the unrealized coverage potential due to power amplifier (PA) backoff. NPUSCH (the uplink NB-IoT data channel) with 15 kHz single-tone gives a layer-1 data rate of approximately 20 bps when configured with the highest repetition factor, i.e., 128, and the lowest modulation and coding scheme. NPDSCH (the downlink NB-IoT data channel) gives a layer-1 data rate of 35 bps when configured with repetition factor 512 and the lowest modulation and coding scheme. These configurations support close to 170 dB coupling loss. In comparison, the Rel-12 LTE network is designed for up to approximately 142 dB coupling loss.

It should be noted that certain usages of the electronic device 102 are better suited for the low data rate mode. For example, a typical electronic device, such as a physically small wearable device, may be used for voice calls, streaming audio, and delay-insensitive text communications (e.g., email, SMS, instant messaging, etc.). Voice calls typically have a data rate of 12.2 kbps or less, streaming audio typically has a data rate of 300 kbps or less, and text communications typically have a data rate of much less than 12.2 kbps. The typical data rates for these usages of the electric device are therefore much lower than the maximum data rate of high data rate modes, such as LTE Category 1. As such, the electronic device 102 will be able to work correctly for these usages when connected to the network 120 via a high data rate mode.

When connected to the network 120 in a low data rate mode, usages of the electronic device 102 such as text communications may still work reasonably well. However, delay-sensitive usages (e.g., voice calls and streaming audio) would typically not be usable when the electronic device 102 is connected to the network 120 via a low data rate mode. This is particularly due to the need to repeat the sending of bits of data multiple times when connected to the network 120 in certain low data rate modes, such as an ultra-low data rate mode. For example, if the delay is greater than 50 ms when the electronic device 102 is connected to the network 120 via a low data rate mode, then voice calls would not be available due to the corresponding speech packets not being able to be repeated enough to be successfully received. It should be noted that, in general, speech is classified as voiced and unvoiced speech, and is referred to herein as speech packets to cover both. Alternatively, delays can become so large as to be unacceptable for voice communications. One way to reduce delay is to choose a different (i.e., lower) speech codec rate (e.g. 4.75 kbps AMR codec instead of a 12.2 kbps AMR codec) that reduces the required repetition factor needed to achieve coverage (close the radio link budget) and hence reduces the delay to an acceptable level so that speech packets are not dropped. The user may decide which low and high speech codec rates (and the speech codecs themselves) to configure via the user interface of the electronic device 102.

If it is determined that the electronic device 102 is not communicating with the network 120 via a low data rate mode at step 204, then the method 200 may return to step 202 so that the electronic device 102 communicates with the network 120 via a high data rate mode. However, if it is determined at step 204 that the electronic device 102 is communicating with the network 120 via a low data rate ode, then the method 200 may continue to step 206. At step 206, the transceiver 104 of the electronic device 102 may transmit a notification to the transceiver 152 of the server 150 that indicates that the electronic device 102 is communicating with the network 120 via a low data rate mode. The notification may enable the server 150 to intercept and process incoming communications for the electronic device 102, as described in more detail below with regards to FIG. 4.

The processor 106 of the electronic device 102 may transmit a message for display on the user interface 108 that indicates that the electronic device 102 is communicating with the network 120 via a low data rate mode, such as at step 208. The user interface 108 may display this message so that the user is informed that the operation and behavior of the electronic device 102 has been modified due to the low data rate mode connection. For example, the message may state that the electronic device 102 is in a range-extended mode, that certain applications have been prohibited from use (e.g., voice calls and streaming audio), that only certain applications are allowed to be used (e.g., text communications), and/or that the behavior of certain applications has been changed. Informing the user of the change to communication in a low data rate mode may enhance satisfaction with the electronic device 102 because the user may feel assurance that the electronic device 102 can still send and receive data and be connected to the network 120.

The operation and behavior of aspects of the electronic device 102 may be modified, such as at step 210. The modifications at step 210 may include, for example, changing a behavior of the user interface 108, changing the behavior of particular applications on the electronic device 102, prohibiting the use of particular applications on the electronic device 102, and/or allowing the use of only particular applications on the electronic device 102. In embodiments, changing the behavior of the user interface 108 may include, for example, modifying the appearance of the user interface 108 to indicate that the electronic device 102 is communicating with the network 120 via a low data rate mode, hiding certain applications that cannot be used, and/or emphasizing certain applications that can only be used. The user may therefore be assisted in using the electronic device 102 when it is communicating with the network 120 via a low data rate mode when the behavior of the user interface 108 is changed at step 210. For example, a user interface speech icon may change its color to indicate when lower codec rates are in use, e.g., become darker and/or redder as the speech codec rate is lowered.

The behavior of particular applications on the electronic device 102 may also be changed at step 210, in some embodiments. For example, a phone application executing on the electronic device 102 may not allow voice calls but may allow voicemail access and/or transcriptions to be received. As another example, an audio application executing on the electronic device 102 may not allow streaming audio but may allow access to locally stored audio files. As a further example, the phone application executing on the electronic device 102 may enable speech signal processing to create more delay by time scaling (e.g., stretching) the audio to occupy a larger portion of time than the speech packet originally occupied for a given codec (e.g., 20 ms) and, thereby, allow use of a larger repetition factor to close the radio link budget.

In further embodiments, a particular channel coder may be selected for use by the electronic device 102 at step 210. For example, when the electronic device 102 is communicating with the network 120 in a low data rate mode, the selected channel coder may include polar codes or tail biting convolutional codes. When the electronic device 102 is communicating with the network 120 in a high data rate mode (e.g., at step 202), the selected channel coder may include low density parity check (LDPC) or turbo codes. The selection of a particular channel coder may be based on the decoding latency or energy efficiency of the particular channel coder. For certain types of electronic devices 102 that require low latency communications, such as mission critical Internet of Things (IoT) devices, the selected channel coder may have a relatively low latency (e.g., LDPC). When the battery life of the electronic device 102 is important, the selected channel coder may have better energy efficiency (e.g., joules/bit) than other channel coders that are less energy efficient. In situations when the electronic device 102 conducts small data transactions such that low latency is not required, the selected channel coder (e.g., polar codes) may have a better bit error rate (BER) performance for small packets or small payload sizes.

The use of particular applications on the electronic device 102 may be prohibited at step 210, in embodiments. For example, a phone application or a streaming media application may not be allowed to be executed. This is due to the insufficient bandwidth and data rate available when the electronic device 102 is communicating with the network 120 via a low data rate mode. Conversely, the use of only particular applications may be allowed at step 210, in embodiments. For example, an email application or a text message application may only be allowed to be executed. In low data rate mode, applications such as these may still be usable because the bandwidth and data rate are still sufficient to support their functionality.

After modifying operation of the electronic device at step 210, it may be determined whether the electronic device 102 is communicating with the network 120 via a high data rate mode, such as at step 212. An embodiment of step 212 for determining whether the electronic device 102 is communicating with the network 120 via a high data rate mode is shown in the method 300 of FIG. 3 described in more detail below. If it is determined at step 212 that the electronic device 102 is not communicating with the network 120 via a high data rate mode (i.e., is communicating with the network 120 via a low data rate mode), then the method 200 may return to step 210 to continue modifying the operation of the electronic device 102. However, if it is determined at step 212 that the electronic device 102 is communicating with a high data rate mode (i.e., is no longer communicating with the network 120 via a low data rate mode), then the method 200 may continue to step 214. At step 214, the transceiver 104 of the electronic device 102 may transmit a notification to the transceiver 152 of the server 150 that indicates that the electronic device 102 is communicating with the network 120 via a high data rate mode. The notification may enable the server 150 to cease intercepting and processing incoming communications for the electronic device 102, as described in more detail below with regards to FIG. 4. The method 200 may return to step 202 so that the electronic device 102 communicates with the network 120 via a high data rate mode.

The method 300 shown in FIG. 3 is an embodiment for determining whether the electronic device 102 is communicating with the network 120 via a tow data rate mode (such as at step 204 described above) or via a high data rate mode (such as at step 212 described above). As described above, when connected to the network 120 in an ultra-low data rate mode (which is a subset of a low data rate mode), the electronic device 102 may receive repeated bits of data to ensure that a particular piece of data is successfully received. The amount of repeated received data may be measured by the transceiver 104 of the electronic device 102, such as at step 302.

The amount of repeated received data may be the number of times a data payload or packet has been redundantly sent (e.g., transmitted) and is given by the number of (transmissions) repetitions set for the packet. The amount of repeated received data may also be known as the repetition factor. Coverage extension may be achieved by trading off data rate through increasing the number of repetitions. Other ways of repetition may include Hybrid ARQ (HARQ) where a packet is retransmitted k times using some combination of its coded (e.g., systematic and parity) bits. The number of retransmissions (also called HARQ transmissions) k can vary from 0 to N where N is typically limited between four and eight.

At step 304, the processor 106 may calculate a delay index based on the amount of repeated received data measured at step 302. The processor 106 may determine at step 306 whether the calculated delay index from step 304 exceeds a predetermined threshold. The predetermined threshold may indicate whether the amount of repeated data is too great to support usages of the electronic device 102 that require a high data rate mode, such as voice calls and streaming audio. The predetermined threshold may vary depending on the exact data mode that the electronic device 102 is communicating with, if the calculated delay index does not exceed the predetermined threshold at step 306, then the electronic device 102 may communicate with the network 120 via a high data rate mode, such as at step 310, then return to step 302 to measure the amount of repeated received data. However, if the calculated delay index exceeds the predetermined threshold at step 306, then the electronic device 102 may communicate with the network 120 via a low data rate mode, such as at step 308.

For example, if a typical delay bound for an LTE speech packet is set to approximately 50 ms and round-trip time (RTT) is 8 ms (for a stop and wait hybrid automatic repeat request (HARQ) with N=8), then there may be up to four or five retransmissions of a certain piece of data (e.g., a speech packet) possible. As such, the predetermined threshold used at step 306 may be five retransmissions in this example. If the calculated delay index exceeds this predetermined threshold at step 306, then voice calls, etc. may not be possible because the electronic device 102 would be communicating with the network 120 via a low data rate mode. The low data rate mode may not be high enough to allow more than the five retransmissions needed to close the RF link budget for the current communications channel. However, if the calculated delay index does not exceed this predetermined threshold at step 306, then voice calls, etc. may be possible because the electronic device 102 would be communicating with the network 120 via a high data rate mode. The high data rate mode may be high enough to allow the five retransmissions needed to close the RF link budget for the current communications channel.

Referring to FIG. 4, the method 400 enables the server 150 to intercept and process incoming communications for the electronic device 102 depending on whether the electronic device 102 is communicating with the network 120 via a high data rate mode or a low data rate mode. In particular, when the electronic device 102 is communicating with the network 120 via a low data rate mode, the server 150 can intercept and process incoming communications to the electronic device 102 so that they can be more useful for a user of the electronic device 102.

A user selection of a configuration may be received by the processor 154 of the server 150, such as at step 402. The configuration may determine which incoming communications may be intercepted and how to process such incoming communications. For example, the configuration may denote how to handle an incoming call to the electronic device 102, such as by connecting the incoming call to a voicemail service, transcribing a recorded voicemail to text, and/or playing an automated response to the caller (e.g., that the user is not available). As another example, the configuration may denote how to handle an incoming message (e.g., email, text message, instant message, etc.) for the electronic device 102, such as by stripping non-text portions (e.g., images or video). The stripped message may be delivered to the electronic device 102. In embodiments, when the stripped message is delivered to the electronic device 102, the non-text portions of the message may be replaced with links to stored copies of the non-text portions so that the user can later download them. A further example is to signal the network 120 to choose a lower speech codec rate (e.g., 7.95 kbps or 4.75 kbps) when setting up a voice call in a poor coverage location in order to allow use of a larger repetition factor. In this way, the radio link budget can be closed and the speech packet drop rate may be below an acceptable limit to keep voice quality (e.g., MOS) at or above an acceptable level. The default speech codec rates (e.g., AMR 4.75 kbps, AMR 7.95 kbps, AMR 12.2 kbps, and higher rate speech codec with better MOS) and thresholds (e.g., delay thresholds) for their use may be configured by the user. Such configuration settings may be stored in the cloud (e.g., memory 156) and may be accessed by the network 120 as needed for a user's voice calls when the detected location or channel quality indicator of the electronic device 102 so indicates.

It may be determined whether the transceiver 152 has received a notification from the electronic device 102 that it is communicating with the network 120 via a low data rate mode, such as at step 404. The notification may have been transmitted when the electronic device 102 has determined it is communicating with the network 120 via a low data rate mode, as described above in step 206. If it is determined that the transceiver 152 has not received such a notification, then the method 400 may remain at step 404. However, if it is determined that the transceiver 152 has received such a notification, then the method 400 may continue to step 406.

At step 406, it may be determined whether an incoming communication has been received for the electronic device 102 at the server 150. An incoming communication may include, for example, an email, voicemail, phone call, text message, instant message, and the like. If it is determined that an incoming communication has been received for the electronic device 102 at step 406, then the method 400 may continue to step 408. At step 408, the incoming communication may be intercepted and processed by the server 150. For example, an incoming phone call may be connected to a voicemail service so that the caller can record a voicemail. The recorded voicemail message may be transcribed to text, instead of forwarding the voicemail message or the call itself. The transcribed voicemail may then be forwarded to the electronic device 102. As another example, non-text portions (e.g., images or video) may be removed from an email, text message, or instant message at step 408 before they are forwarded to the electronic device 102. As a further example, each speech frame or packet of an incoming voice call may be stretched in time by the server 150 to occupy more than the time span (e.g., 20 ms) of the original speech packet created by the speech codec. This may allow for more delay such that a higher repetition factor can be used with the over the air voice/speech packet transmissions in order to close the radio link budget. The worse the coverage, the more the speech may be time stretched by the server 150 until a quality limit is reached such that voice calls are not enabled.

After step 408, the method 400 may continue to step 410 to determine whether the transceiver 152 has received a notification from the electronic device 102 that it is communicating with the network 120 via a high data rate mode. This notification may have been transmitted when the electronic device 102 has determined it is communicating with the network 120 via a high data rate mode, as described above in step 214. If it is determined at step 410 that such a notification has not been received, then the method 400 may return to step 406 to determine whether another incoming communication has been received at the server 150 for the electronic device 102. However, if it is determined at step 410 that such a notification has been received, then the method 400 may continue step 412. At step 412, the interception and processing of incoming communications for the electronic device 102 may be ceased at the server 150, and the method 400 may return to step 404 to determine whether a notification of a low data rate mode has been received. Step 410 may also occur if it is determined at step 406 that no incoming communication for the electronic device 102 has been received.

Thus, it should be clear from the preceding disclosure that systems and methods for modifying the operation of an electronic device and enabling a server to intercept and process incoming communications for the electronic device, based on whether the electronic device is communicating with the network via a high data rate mode or a low data rate mode, may be performed to enable more consistent communications capabilities and improve the user experience. The systems and methods can also cause a user to be more satisfied with the operation of the electronic device.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art, to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. An electronic device, comprising:
 a transceiver operatively coupled with a processor, the transceiver configured to wirelessly communicate via a high data rate mode and a low data rate mode;
 a user interface operatively coupled with the processor;
 the processor configured to:
  determine whether the transceiver is communicating via the high data rate mode or the low data rate mode; and
  modify operation of the electronic device based on whether the transceiver is communicating via the high data rate mode or the low data rate mode, comprising selecting a channel coder based on whether the transceiver is communicating via the high data rate mode or the low data rate mode; and
 a memory operatively coupled with the processor.

2. The electronic device of claim 1, wherein the processor is configured to modify operation of the electronic device by changing a behavior of the user interface based on whether the transceiver is communicating via the high data rate mode or the low data rate mode.

3. The electronic device of claim 1, wherein:
 the memory comprises a plurality of applications executable by the processor; and
 the processor is configured to modify operation of the electronic device by changing a behavior of at least one of the plurality of applications based on whether the transceiver is communicating via the high data rate mode or the low data rate mode.

4. The electronic device of claim 1, wherein:
 the memory further comprises a plurality of applications executable by the processor; and
 the processor is configured to modify operation of the electronic device by prohibiting use of at least one of the plurality of applications when the transceiver is communicating via the low data rate mode.

5. The electronic device of claim 4, wherein the at least one of the plurality of applications with prohibited use comprises one or more of a voice calling application or a streaming media application.

6. The electronic device of claim 1, wherein:
 the memory further comprises a plurality of applications executable by the processor; and
 the processor is configured to modify operation of the electronic device by allowing use of at least one of the plurality of applications when the transceiver is communicating via the low data rate mode.

7. The electronic device of claim 1, wherein:
the processor is further configured to transmit a message for display via the user interface, the message indicating that operation of the electronic device has been modified; and
the user interface is configured to display the message.

8. The electronic device of claim 1, wherein:
the transceiver is configured to receive repeated incoming data when communicating via the low data rate mode; and
the processor is further configured to:
  calculate a delay index based on an amount of repeated incoming data;
  determine whether the delay index exceeds a predetermined threshold; and
  modify the operation of the electronic device when the delay index exceeds the predetermined threshold.

9. The electronic device of claim 1, wherein:
the processor is configured to modify operation of the electronic device by transmitting a notification to the transceiver when the transceiver is communicating via the low data rate mode, wherein the notification indicates to a remote server that the electronic device is communicating via the low data rate mode; and
the transceiver is configured to transmit the notification to the remote server.

10. A system, comprising:
(A) an electronic device, comprising:
  a first transceiver operatively coupled with a first processor, the first transceiver configured to:
    wirelessly communicate with a second transceiver via a high data rate mode and a low data rate mode; and
    transmit a first notification to the second transceiver when the first transceiver is communicating via the low data rate mode, wherein the first notification indicates that the electronic device is communicating via the low data rate mode; and
  the first processor configured to:
    determine whether the first transceiver is communicating via the high data rate mode or the low data rate mode; and
    modify operation of the electronic device based on whether the first transceiver is communicating via the high data rate mode or the low data rate mode; and
  a first memory operatively coupled with the first processor; and
(B) a server, comprising:
  the second transceiver operatively coupled with a second processor, the second transceiver configured to:
    wirelessly communicate with the first transceiver via the high data rate mode and the low data rate mode; and
    receive the first notification from the electronic device;
  the second processor configured to:
    intercept and process an incoming communication for the electronic device based on a preset configuration, in response to receiving the first notification from the electronic device; and
  a second memory operatively coupled with the second processor.

11. The system of claim 10, wherein:
the first transceiver is further configured to:
  transmit a second notification via the first transceiver to the second transceiver when the first transceiver is communicating via the high data rate mode, wherein the second notification indicates that the electronic device is communicating via the high data rate mode; and
  receive the second notification from the electronic device via the second transceiver; and
the second processor is further configured to cease intercepting and processing the incoming communication for the electronic device based on the preset configuration, in response to receiving the second notification from the electronic device.

12. The system of claim 10, wherein:
the incoming communication comprises an incoming phone call to the electronic device;
the second processor is configured to intercept and process the incoming communication by connecting the incoming phone call to a voicemail service to record a voicemail; and
the second transceiver is further configured to transmit a transcribed text of the voicemail to the electronic device.

13. The system of claim 10, wherein:
the incoming communication comprises an incoming email containing an image; and
the second processor is configured to intercept and process the incoming communication by removing the image from the incoming email to generate a modified email; and
the second transceiver is further configured to transmit the modified email to the electronic device via the second transceiver.

14. The system of claim 10, wherein the second processor is further configured to receive a user selection of the preset configuration.

15. A method, comprising:
determining whether a transceiver of an electronic device is communicating via a high data rate mode or a low data rate mode;
receiving, at the electronic device, repeated incoming data when the transceiver is communicating via the low data rate mode;
calculating a delay index based on an amount of repeated incoming data;
determining whether the delay index exceeds a predetermined threshold;
modifying operation of the electronic device based on whether the transceiver is communicating via the high data rate mode or the low data rate mode, comprising modifying the operation of an application of the electronic device when the delay index exceeds the predetermined threshold; and
displaying a message on a user interface of the electronic device when the transceiver is communicating via the low data rate mode, the message indicating that the operation of the electronic device has been modified.

16. The method of claim 15, wherein modifying operation of the electronic device comprises one or more of:
changing a behavior of the user interface based on whether the transceiver is communicating via the high data rate mode or the low data rate mode;
changing a behavior of at least one of a plurality of applications operating on the electronic device based on whether the transceiver is communicating via the high data rate mode or the low data rate mode;
disabling at least one of the plurality of applications when the transceiver is communicating via the low data rate mode;

restricting user access to at least one of the plurality of applications when the transceiver is communicating via the low data rate mode; or selecting a channel coder based on whether the transceiver is communicating via the high data rate mode or the low data rate mode.

17. The method of claim 16, wherein the plurality of applications comprises one or more of a voice calling application, a streaming media application, an email application, or a text message application.

18. The method of claim 15, wherein modifying operation of the electronic device comprises transmitting a notification via the transceiver to a remote server when the transceiver is communicating via the low data rate mode, wherein the notification indicates to the remote server that the electronic device is communicating via the low data rate mode.

19. An electronic device, comprising:
  a transceiver operatively coupled with a processor, the transceiver configured to wirelessly communicate via a high data rate mode and a low data rate mode, and further configured to transmit a notification to a remote server;
  a user interface operatively coupled with the processor;
  the processor configured to:
    determine whether the transceiver is communicating via the high data rate mode or the low data rate mode; and
    modify operation of the electronic device based on whether the transceiver is communicating via the high data rate mode or the low data rate mode, comprising transmitting the notification to the transceiver when the transceiver is communicating via the low data rate mode, wherein the notification indicates to the remote server that the electronic device is communicating via the low data rate mode; and
  a memory operatively coupled with the processor.

20. A method, comprising:
  determining whether a transceiver of an electronic device is communicating via a high data rate mode or a low data rate mode;
  modifying operation of the electronic device based on whether the transceiver is communicating via the high data rate mode or the low data rate mode, comprising transmitting a notification via the transceiver to a remote server when the transceiver is communicating via the low data rate mode, wherein the notification indicates to the remote server that the electronic device is communicating via the low data rate mode; and
  displaying a message on a user interface of the electronic device when the transceiver is communicating via the low data rate mode, the message indicating that the operation of the electronic device has been modified.

* * * * *